US012164317B2

(12) United States Patent
Chang et al.

(10) Patent No.: US 12,164,317 B2
(45) Date of Patent: *Dec. 10, 2024

(54) LOW-DROPOUT VOLTAGE REGULATOR CIRCUIT

(71) Applicant: Taiwan Semiconductor Manufacturing Co., Ltd., Hsin-Chu (TW)

(72) Inventors: Yen-An Chang, Hsin-Chu (TW); Chia-Fu Lee, Hsinchu (TW); Yu-Der Chih, Hsin-Chu (TW); Yi-Chun Shih, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,772

(22) Filed: Aug. 10, 2023

(65) Prior Publication Data

US 2023/0393598 A1 Dec. 7, 2023

Related U.S. Application Data

(63) Continuation of application No. 17/339,818, filed on Jun. 4, 2021, now Pat. No. 11,797,034, which is a continuation of application No. 16/738,963, filed on Jan. 9, 2020, now Pat. No. 11,042,176, which is a continuation of application No. 15/494,329, filed on Apr. 21, 2017, now Pat. No. 10,534,386.

(60) Provisional application No. 62/427,722, filed on Nov. 29, 2016.

(51) Int. Cl.
*G05F 1/56* (2006.01)

(52) U.S. Cl.
CPC .................................... *G05F 1/56* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | |
|---|---|---|---|
| 4,818,901 A | 4/1989 | Young et al. | |
| 5,430,389 A | 7/1995 | Kamiya | |
| 5,604,417 A | 2/1997 | Kaminaga et al. | |
| 5,638,320 A | 6/1997 | Wong et al. | |
| 6,201,375 B1 | 3/2001 | Larson et al. | |
| 6,229,289 B1 | 5/2001 | Piovaccari et al. | |
| 6,346,801 B1 | 2/2002 | Zafarana et al. | |
| 7,643,322 B1 * | 1/2010 | Varga .................... | H02M 3/156 307/66 |

(Continued)

*Primary Examiner* — Thienvu V Tran
*Assistant Examiner* — Nusrat Quddus
(74) *Attorney, Agent, or Firm* — Duane Morris LLP

(57) ABSTRACT

A voltage regulation circuit includes a voltage regulator that is configured to provide a stable output voltage based on an input voltage; and a control circuit, coupled to the voltage regulator, and configured to provide an injection current to maintain the stable output voltage in response to an enable signal provided at an input of the control circuit transitioning to a predetermined state and cease providing the injection current when the control circuit detects that a voltage level of the output voltage is higher than a pre-defined voltage level.

20 Claims, 7 Drawing Sheets

(56) References Cited

U.S. PATENT DOCUMENTS

| | | | |
|---|---|---|---|
| 8,203,276 | B2 | 6/2012 | Shackle et al. |
| 8,289,009 | B1 | 10/2012 | Strik et al. |
| 8,461,880 | B2 * | 6/2013 | Tran ................ H03K 19/00315 327/108 |
| 8,595,861 | B2 | 11/2013 | Liu et al. |
| 8,816,655 | B2 | 8/2014 | Zhu |
| 9,608,537 | B1 | 3/2017 | Lee |
| 9,703,303 | B2 | 7/2017 | Nagda et al. |
| 10,534,826 | B2 | 1/2020 | Breedvelt-Schouten et al. |
| 10,571,945 | B2 | 2/2020 | Pishdad |
| 11,042,176 | B2 | 6/2021 | Chang et al. |
| 11,249,530 | B1 * | 2/2022 | Pal ............................ G05F 1/59 |
| 2005/0007359 | A1 | 1/2005 | Iseki et al. |
| 2005/0207189 | A1 | 9/2005 | Chen |
| 2005/0254304 | A1 | 11/2005 | Seo et al. |
| 2006/0202738 | A1 | 9/2006 | Gatta et al. |
| 2010/0134085 | A1 | 6/2010 | Nishida |
| 2012/0037805 | A1 | 2/2012 | Dupont et al. |
| 2012/0098508 | A1 * | 4/2012 | Zhu ........................... G05F 1/56 323/272 |
| 2012/0163110 | A1 | 6/2012 | Sinha et al. |
| 2013/0141151 | A1 | 6/2013 | Ochoa et al. |
| 2013/0320942 | A1 | 12/2013 | Vemula |
| 2014/0145695 | A1 * | 5/2014 | Riedel ....................... G06F 1/30 323/281 |
| 2014/0183364 | A1 | 7/2014 | Dupont et al. |
| 2015/0061621 | A1 * | 3/2015 | Pons ......................... G05F 1/56 323/280 |
| 2015/0077076 | A1 * | 3/2015 | Bhattad ..................... G05F 1/56 323/280 |
| 2015/0160667 | A1 | 6/2015 | Tai |
| 2015/0309518 | A1 * | 10/2015 | Nagda ..................... G05F 1/468 323/274 |
| 2016/0011615 | A1 | 1/2016 | Hu et al. |
| 2016/0282889 | A1 | 9/2016 | Mahajan et al. |
| 2016/0359405 | A1 | 12/2016 | Li et al. |
| 2017/0371366 | A1 | 12/2017 | Liu |
| 2018/0026531 | A1 | 1/2018 | Nagda et al. |
| 2018/0150090 | A1 | 5/2018 | Chang et al. |
| 2020/0285260 | A1 * | 9/2020 | Londak ................... G05F 1/565 |
| 2020/0409402 | A1 | 12/2020 | Chang et al. |
| 2022/0115053 | A1 | 4/2022 | Ji |
| 2022/0147082 | A1 | 5/2022 | Melanson et al. |
| 2022/0171417 | A1 | 6/2022 | Fiocchi |
| 2022/0329060 | A1 * | 10/2022 | Serpedin ................... G05F 1/56 |
| 2023/0105664 | A1 | 4/2023 | Zhang et al. |
| 2023/0130733 | A1 * | 4/2023 | Zhang ....................... G05F 3/26 323/274 |
| 2024/0055987 | A1 * | 2/2024 | Groom ................ H02M 1/0045 |
| 2024/0176372 | A1 * | 5/2024 | Lee ......................... G05F 1/575 |

* cited by examiner

250

LOW-DROPOUT VOLTAGE REGULATOR CIRCUIT

CROSS-REFERENCE TO RELATED APPLICATION

This application is a continuation of U.S. patent application Ser. No. 17/339,818, filed Jun. 4, 2021, which is a continuation of U.S. patent application Ser. No. 16/738,963, filed Jan. 9, 2020, now U.S. Pat. No. 11,042,176, which is a continuation of U.S. patent application Ser. No. 15/494,329, filed Apr. 21, 2017, now U.S. Pat. No. 10,534,36 which claims priority to U.S. Provisional Patent Application No. 62/427,722, filed on Nov. 29, 2016, each of which are incorporated by reference herein in their entireties.

BACKGROUND

The semiconductor industry has experienced rapid growth due to improvements in the integration density of a variety of electronic components (e.g., transistors, diodes, resistors, capacitors, etc.). Generally, such improvement in integration density results from shrinking the semiconductor process node (e.g., shrinking the process node towards the sub-20 nm node). Commensurate with shrinking dimensions is an expectation of increased performance with reduced power consumption. In this regard, a linear voltage regulator, e.g., a low-dropout (LDO) regulator, is typically used to provide a well-specified and stable direct-current (DC) voltage. Generally, an LDO regulator is characterized by its low dropout voltage, which refers to a small difference between respective input voltage and output voltage.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
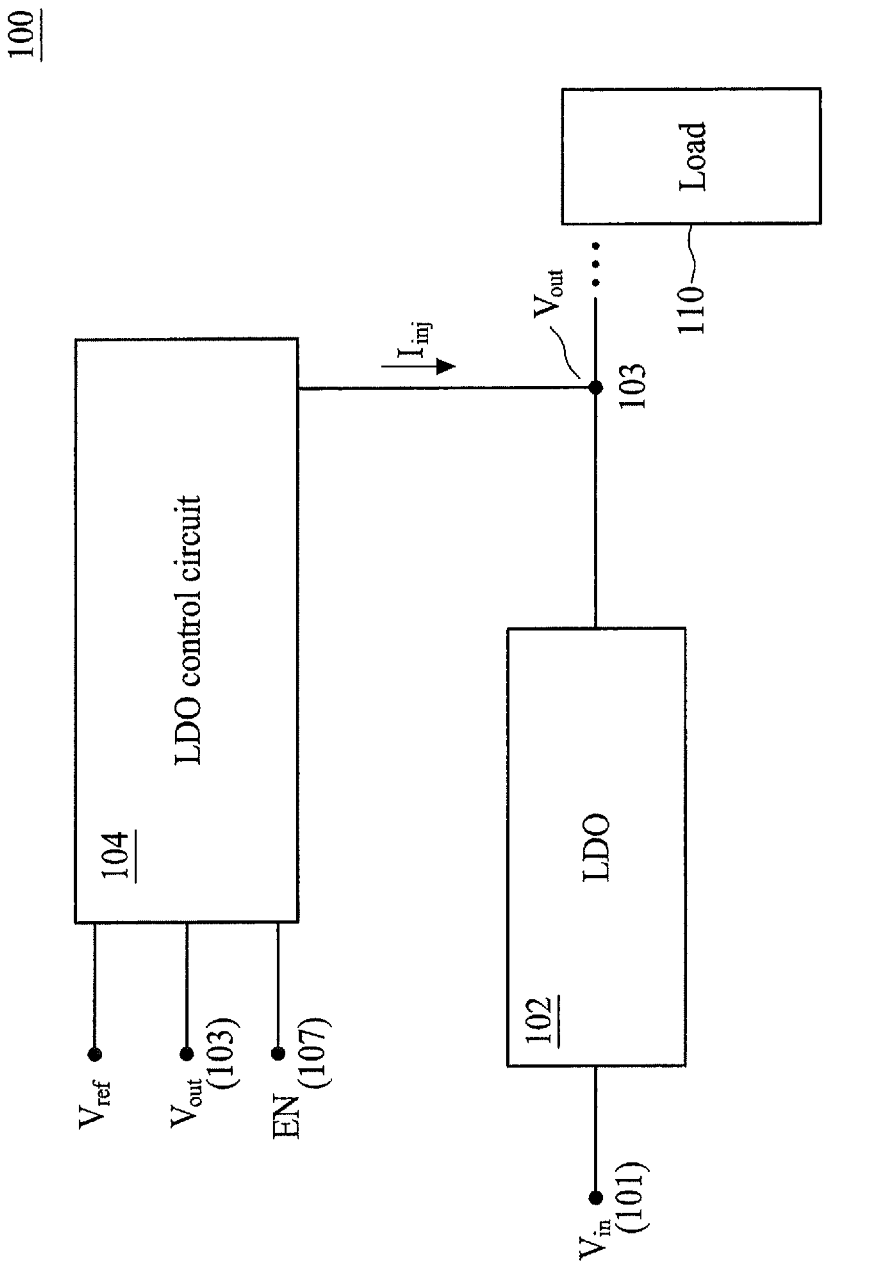
FIG. 1 illustrates an exemplary block diagram of a low-dropout (LDO) regulator circuit, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In general, a low-dropout (LDO) regulator is configured to provide a well-specified and stable direct-current (DC) output voltage (e.g., a regulated output voltage) based on an input voltage (e.g., an unregulated input voltage) with a low dropout voltage. The "dropout voltage" used herein typically refers to a minimum voltage required across the (LDO) regulator to maintain the output voltage being regulated. Even though the input voltage, provided by a power source, falls to a level very near that of the output voltage and is unregulated, the LDO regulator can still produce the output voltage that is regulated and stable. Such a stable characteristic enables the LDO regulator to be used in a variety of integrated circuit (IC) applications, for example, a memory device, a power IC device, etc. To further ensure the regulated output voltage provided by the LDO regulator remains as stable as possible when coupled to various levels of loading, an injection, or a kicker, circuit is used. Such an injection circuit is typically coupled to an output node of the LDO regulator where the output voltage of the LDO regulator is provided. When the loading of the LDO regulator transitions from a light level to a heavy level, the output voltage may be transiently pulled to a lower voltage level. To compensate this so as to maintain the stable output voltage, the injection circuit is activated to provide a substantially large injection current to the output node of the LDO regulator, and in turn to the load. However, conventional injection circuits generally use a pre-defined delay to cease providing such a large injection current. As such, a variety of issues may occur such as, for example, a presence of an undesirable overshoot of the output voltage which may in turn cause damage to the load (e.g., a device or circuit that receives the output voltage from the LDO regulator).

The present disclosure provides various embodiments of an LDO regulator circuit. The LDO regulator circuit includes an LDO regulator and an LDO control circuit coupled thereto. In some embodiments, the LDO control circuit is configured to dynamically monitor a loading of the LDO regulator and provides a corresponding response so as to avoid the above-mentioned issues while simultaneously maintaining the LDO regulator's stable output voltage. More specifically, in some embodiments, the LDO control circuit includes an injection circuit that is selectively inactivated by comparing a voltage level of the output voltage, which is monitored in real-time, to a reference voltage level. As such, the injection circuit of the disclosed LDO control circuit may not overly provide an injection current to an output node of the LDO regulator, which advantageously avoids the overshoot issue. Moreover, such reference voltage level can be pre-defined to be different from an input voltage of the LDO regulator. As such, extra flexibilities may be provided in terms of applications of the disclosed LDO regulator circuit.

FIG. 1 illustrates an exemplary block diagram of a low-dropout (LDO) regulator circuit 100, in accordance with various embodiments. As shown, the LDO regulator circuit 100 includes an LDO regulator 102 and an LDO control circuit 104 coupled to the LDO regulator 102. In some embodiments, the LDO regulator 102 is configured to receive an input voltage $V_{in}$ at its input node 101, which may be provided by a power source (e.g., a battery) that may be unregulated, and provide a regulated output voltage $V_{out}$ at its output node 103. The voltage level of the output voltage $V_{out}$ may be lower than the voltage level of the input voltage $V_{in}$ by a substantially small amount (e.g., from about 100 mV to about 1 V), which is generally referred to as the LDO regulator 102's dropout voltage. As the name "low-dropout" implies, such a dropout voltage is typically selected to be substantially small. Further, in some embodiments, the LDO control circuit 104 is coupled to the output node of the LDO regulator 102, i.e., 103.

Generally, the LDO control circuit 104 is configured to assist maintaining the output voltage at a substantially stable value while various levels of loading are each coupled to the output node 103. More specifically, in accordance with some embodiments, the LDO control circuit 104 is activated by an enable (EN) signal 107. Upon being activated, the LDO control circuit 104 is configured to provide an injection current ($I_{inj}$) to the output node 103 (and the coupled load 110), and monitors the output voltage $V_{out}$ on the fly to compare $V_{out}$ with a pre-defined reference voltage $V_{ref}$ so as to selectively inactivate the injection current $I_{inj}$. Details of the LDO regulator 102 and the LDO control circuit 104 will be discussed in further detail below with respect to FIGS. 2A, and 2B-2C, respectively.

As mentioned above, the LDO control circuit 104 is activated to provide the injection current $I_{inj}$ in response to the EN signal 107 being asserted to a high logic state (HIGH). In some embodiments, such an EN signal 107 may be an enable signal that is provided by the load 110 of the LDO regulator circuit 100 such as, for example, a memory device. More specifically, the EN signal 107 may be asserted to HIGH when a user intends to operate the load 110. In some embodiments, the EN signal 107 is also provided as an input signal to the LDO control circuit 104. That is, when the user operates the load 110, the user may also activate the LDO control circuit 104 to provide the injection current $I_{inj}$. For example, in the embodiments in which the load 110 includes a memory device, the EN signal 107 may be asserted to HIGH when the memory device is accessed, e.g., read or written to, by a user. When the memory device (i.e., the load 110) is accessed, the EN signal 107 transitions to HIGH. Accordingly, the LDO regulator 102 may generate a voltage for a word line of the memory device to read out a data bit from at least one memory cell of the memory device. Further, according to some embodiments, the LDO control circuit 104 is also activated to provide the injection current $I_{inj}$.

Figure 2A:
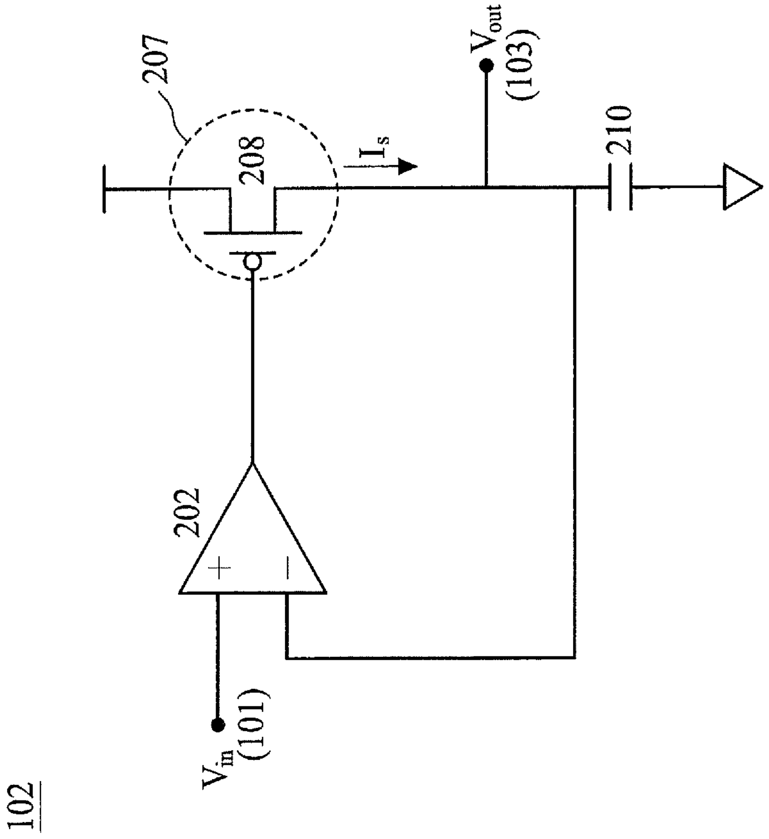
FIG. 2A illustrates an exemplary circuit diagram of an LDO regulator of the LDO regulator circuit of FIG. 1, respectively, in accordance with some embodiments.

FIG. 2A illustrates an exemplary circuit diagram of the LDO regulator 102, in accordance with various embodiments. It is noted that the illustrated embodiment of FIG. 2A is merely a simplified circuit diagram provided for explanation. That is, the LDO regulator 102 can be implemented as any of a variety of circuit diagrams of an LDO regulator to include other circuit elements and/or circuits, for example, a voltage divider, a Miller compensation circuit, one or more switches, etc.

In some embodiments, the LDO regulator 102 includes an error amplifier 202, a transistor 208, and a capacitor 210. The error amplifier 202 includes first and second input terminals (e.g., a non-inverting input terminal and an inverting input terminal) that are coupled to the input node 101 and the output node 103, respectively. An output terminal of the error amplifier 202 is coupled to a standby current source 207 (formed by the transistor 208). In some embodiments, the standby current source 207 is implemented as a p-type metal-oxide-semiconductor (PMOS) transistor 208. However, it is understood that the standby current source 207 may be implemented as any of a variety of transistors and/or circuits. Further to the embodiment that the standby current source 207 is implemented as the PMOS transistor 208, a gate of the transistor 208 is coupled to the output terminal of the error amplifier 202, a source of the transistor 208 is coupled to a first supply voltage (e.g., Vdd), and a drain of the transistor 208 is coupled to the output node 103.

As mentioned above, since the illustrated embodiment of the LDO regulator 102 in FIG. 2A is merely a simplified example, operation of the LDO regulator 102 is briefly described as follows. To operate the LDO regulator 102, in some embodiments, a standby current $I_s$ is generated by the standby current source 207. The standby current $I_s$ charges the capacitor 210 to establish the output voltage $V_{out}$ at the output node 103. The output voltage $V_{out}$ is controlled by the input voltage $V_{in}$ at the non-inverting input terminal of the error amplifier 202. More specifically, when the voltage level of $V_{out}$ is relatively high, an error voltage (i.e., the output of the error amplifier 202) received by the gate of the transistor 208 proportionally increases. The increase in the error voltage reduces source-gate voltage ($V_{sg}$) of the transistor 208 (i.e., the standby current source 207), which causes a decrease in the standby current $I_s$. As a result, the voltage level of $V_{out}$ decreases. Through an opposite mechanism, a relatively low output voltage level pulls down the error voltage, then increases the standby current $I_s$, and in turn increases the voltage level of $V_{out}$. In other words, the LDO regulator 102 is configured to control the voltage level of $V_{out}$ to be at a substantially stable value, and such a stable value is controlled to be close to the voltage level of the input voltage $V_{in}$.

Figure 2B:
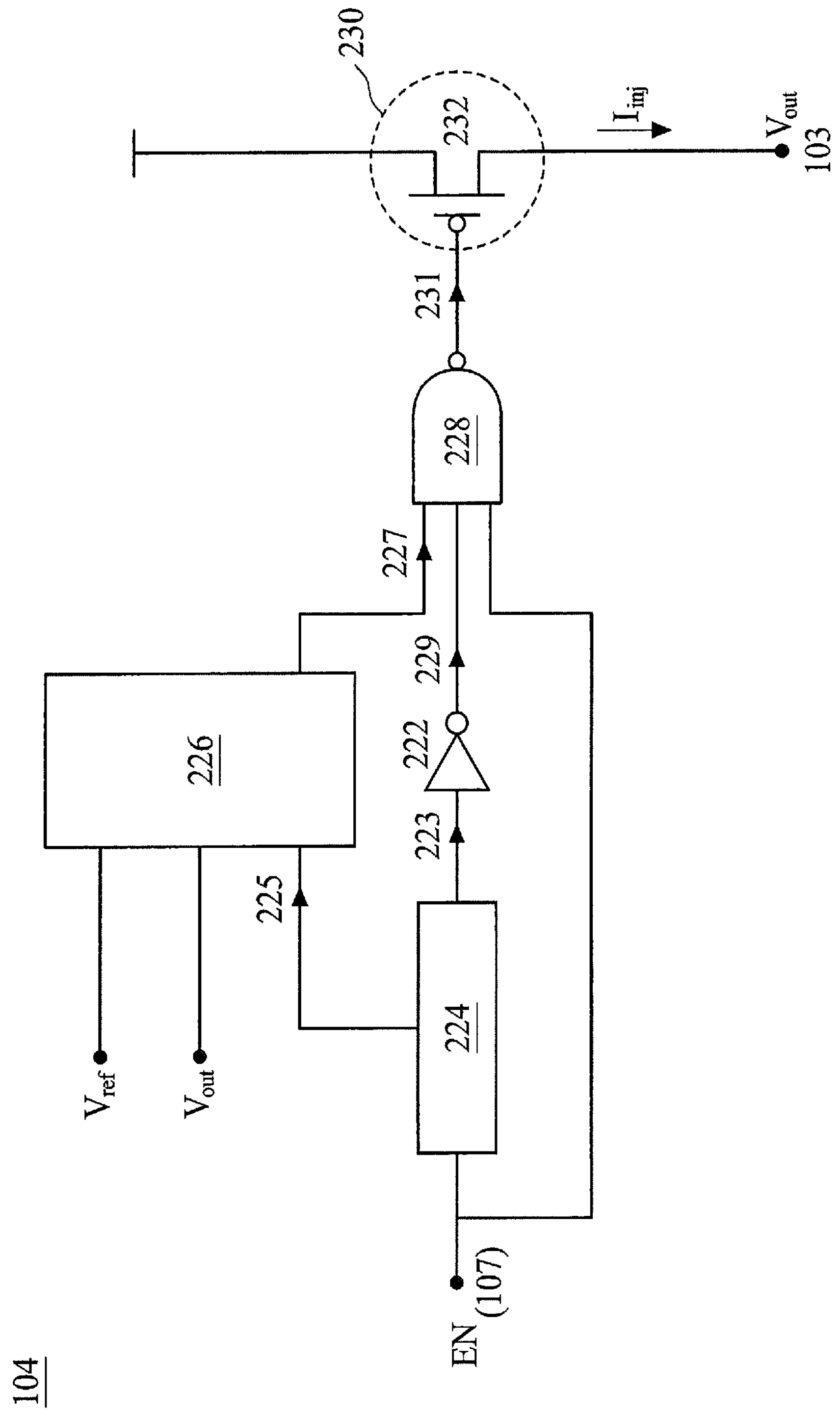
FIG. 2B illustrates an exemplary circuit diagram of an LDO control circuit of the LDO regulator circuit of FIG. 1, respectively, in accordance with some embodiments.

FIG. 2B illustrates an exemplary schematic diagram of the LDO control circuit 104, in accordance with various embodiments. As shown, the LDO control circuit 104 includes an inverter 222, a delay circuit 224, a sensor circuit 226, a logical gate 228, and an injection circuit 230. In some embodiments, the delay circuit 224 includes a plurality of delay gates (e.g., inverters) serially coupled to one another. Part of the delay gates are configured to delay the EN signal 107 by a first delay, and provide a sensor enable signal 225 with the first delay to activate the sensor circuit 226. Moreover, the plurality of delay gates (i.e., the whole delay circuit 224) are configured to delay the EN signal 107 by a second delay so as to provide a delay output signal 223 (with the second delay). Further, the delay output signal 223 is provided to the logical gate 228 through the inverter 222 as signal 229. As such, the signal 229 is logically inverted to the delay output signal 223 (with a gate delay). For purposes of clarification, the signal 229 is herein referred to as "inverted delayed signal 229." In some embodiments, the first delay is different from the second delay. In some alternative embodiments, the delay circuit 224 may be optional, i.e., no delays between the delay output signal 223 and the sensor enable signal 225.

In some embodiments, the sensor circuit 226 may include a comparator circuit that has two input terminals: an inverting input terminal configured to receive the output voltage Vow present at the output node 103, and a non-inverting input terminal configured to receive the reference voltage $V_{ref}$. As mentioned above, the sensor circuit 226 is activated by the sensor enable signal 225, in accordance with various embodiments. Upon being activated, the sensor circuit 226 is configured to provide a sensor output signal 227 to the logic gate 228 based on a comparison of the voltage levels of $V_{out}$ and $V_{ref}$, which will be discussed in further detail below.

Referring still to FIG. 2B, in some embodiments, the logic gate 228 includes a NAND logic gate that is configured to receive the EN signal 107, the sensor output signal 227, and the inverted delayed signal 229 (the logically inverted version of the delay output signal 223) at its input terminals, and perform a NAND logic function on the received signals so as to provide an injection control signal 231. Such an injection control signal 231 may include a pulse signal. Moreover, in accordance with various embodiments, such an injection control signal 231 that includes one or more pulses may be used to activate/inactivate the injection circuit 230. In some embodiments, the injection circuit 230 is implemented by a PMOS transistor 232. In some other embodiments, the injection circuit 230 may be implemented by any of a variety of transistors/circuit elements while remaining within the scope of the present disclosure. Further to the embodiment in which the injection circuit 230 includes the PMOS transistor 232, the PMOS transistor 232 is coupled between Vdd and the output node 103 at its source and drain, respectively, and a gate of the PMOS transistor 232 is configured to receive the injection control signal 231. Depending on a logical state of the injection control signal (the pulse signal) 231, the PMOS transistor 232 may be turned on or off, which correspond to activation and inactivation of the injection current $I_{inj}$, respectively. The herein-mentioned signals (e.g., 225, 227, 229, 231, etc.) that are used to operate the LDO control circuit 104 will be discussed in further detail below with respect to FIGS. 3A and 3B.

In some embodiments, the PMOS transistor 232 may serve both as a switch and a charging element. In other words, when the PMOS transistor 232 is turned on (activated), the PMOS transistor 232 is configured to charge the output node 103 (and the load 110 coupled thereto) by flowing the injection current $I_{inj}$; and when the PMOS transistor 232 is turned off (inactivated), the PMOS transistor 232 is configured to cease charging the output node 103 (and the load 110 coupled thereto) by stop flowing the injection current Ii n j. As such, in some embodiments, the PMOS transistor 232 may be selected to operate under a linear mode, i.e., $V_{sd1}<V_{sg1}-|V_{t1}|$, wherein $V_{sd1}$ refers to a voltage drop across the source and drain of the PMOS transistor 232, $V_{sg1}$ refers to a voltage drop across the source and gate of the PMOS transistor 232, and $V_{t1}$ refers to a threshold voltage of the PMOS transistor 232.

Figure 2C:
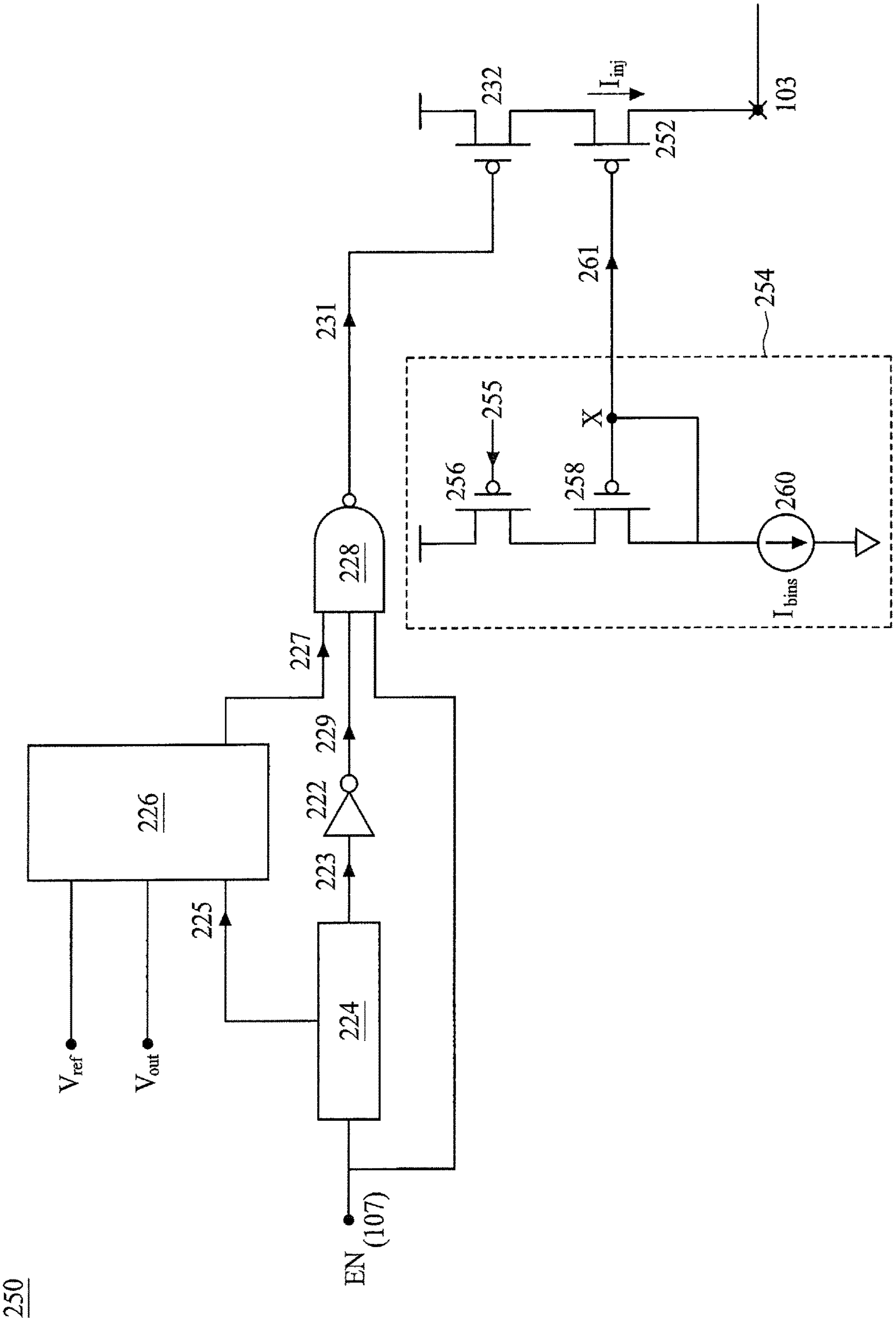
FIG. 2C illustrates another exemplary circuit diagram of the LDO control circuit of the LDO regulator circuit of FIG. 1, in accordance with some embodiments.

FIG. 2C illustrates another exemplary diagram of the LDO control circuit 104, in accordance with various embodiments. For clarity, the illustrated embodiment of FIG. 2C is herein referred to as LDO control circuit 250. In some embodiments, the LDO control circuit 250 is substantially similar to the LDO control circuit 104 (FIG. 2B) except that the LDO control circuit 250 further includes at least an additional PMOS transistor 252 serially coupled between the PMOS transistor 232 and the output node 103, and such a PMOS transistor 252 is biased (gated) by an analog bias control circuit 254. More specifically, in some embodiments, a source of the PMOS transistor 252 is coupled to the drain of the PMOS transistor 232, and a drain of the PMOS transistor 252 is coupled to the output node 103.

Further, the analog bias control circuit 254 is configured to provide a bias voltage 261 at a gate of the PMOS transistor 252 so as to cause the PMOS transistor 252 to operate under a saturation mode, i.e., $V_{sd2}>V_{sg2}-|V_{t2}|$, wherein $V_{sd2}$ refers to a voltage drop across the source and drain of the PMOS transistor 252, $V_{sg2}$ refers to a voltage drop across the source and gate of the PMOS transistor 252, and $V_{t2}$ refers to a threshold voltage of the PMOS transistor 252. As such, while the PMOS transistors 232 and 252 are selected to operate under the linear mode and the saturation mode, respectively, in some embodiments, the PMOS transistor 232 may serve as a switch and the PMOS transistor 252 may serve as a charging element that is configured to provide the injection current $I_{inj}$. Since the PMOS transistor 252 (the charging element in the LDO control circuit 250) operates under the saturation mode, advantageously, the injection current $I_{inj}$ provided by the PMOS transistor 252 may be more stable, which in turn causes the output voltage $V_{out}$ to be more stable. Moreover, in some embodiments, such a bias voltage may be generated through a self-balanced operation performed by the analog bias control circuit 254, which will be discussed in further detail below.

In some embodiments, the analog bias control circuit 254 includes a first PMOS transistor 256, a second PMOS transistor 258, and a current source 260 (e.g., an NMOS transistor gated at a constant voltage), wherein the first and second PMOS transistors 256 and 258, and the current source 260 are serially coupled between Vdd and ground. Further, a source of the first PMOS transistor 256 is coupled to Vdd; a gate of the first PMOS transistor 256 is configured to receive a bias enable signal 255; a drain of the first PMOS transistor 256 is coupled to a source of the second PMOS transistor 258; a gate of the second PMOS transistor 258 is coupled to a drain of the second PMOS transistor 258 at a common node X; and the common node X is coupled to the current source 260 and the gate of the PMOS transistor 252.

By implementing the analog bias control circuit 254 as the circuit diagram of FIG. 2C, a substantially stable bias voltage 261 may be provided to the gate of the PMOS transistor 252 so as to assure the PMOS transistor 252 to operate under the saturation mode. More specifically, in some embodiments, the current source 260 is configured to provide a constant bias current $I_{bias}$. Moreover, once the PMOS transistor 256 receives the bias enable signal 255 that is asserted to LOW, the PMOS transistors 256 is turned on, and, in some embodiments, the PMOS transistors 256 and 258 serve as a current mirror that mirrors the bias current $I_{bias}$ to the PMOS transistors 232 and 252 as the injection current $I_{inj}$. Since the PMOS transistor 258 is diode-connected (i.e., the gate and the drain of the PMOS transistor 258 is tied together), the PMOS transistor 258 is assured to operate under its respective saturation mode, which in turn caused the bias voltage 261 at a substantially stable value, about Vdd−Vth (Vth is a threshold voltage of the PMOS transistor 256).

Figure 3A:
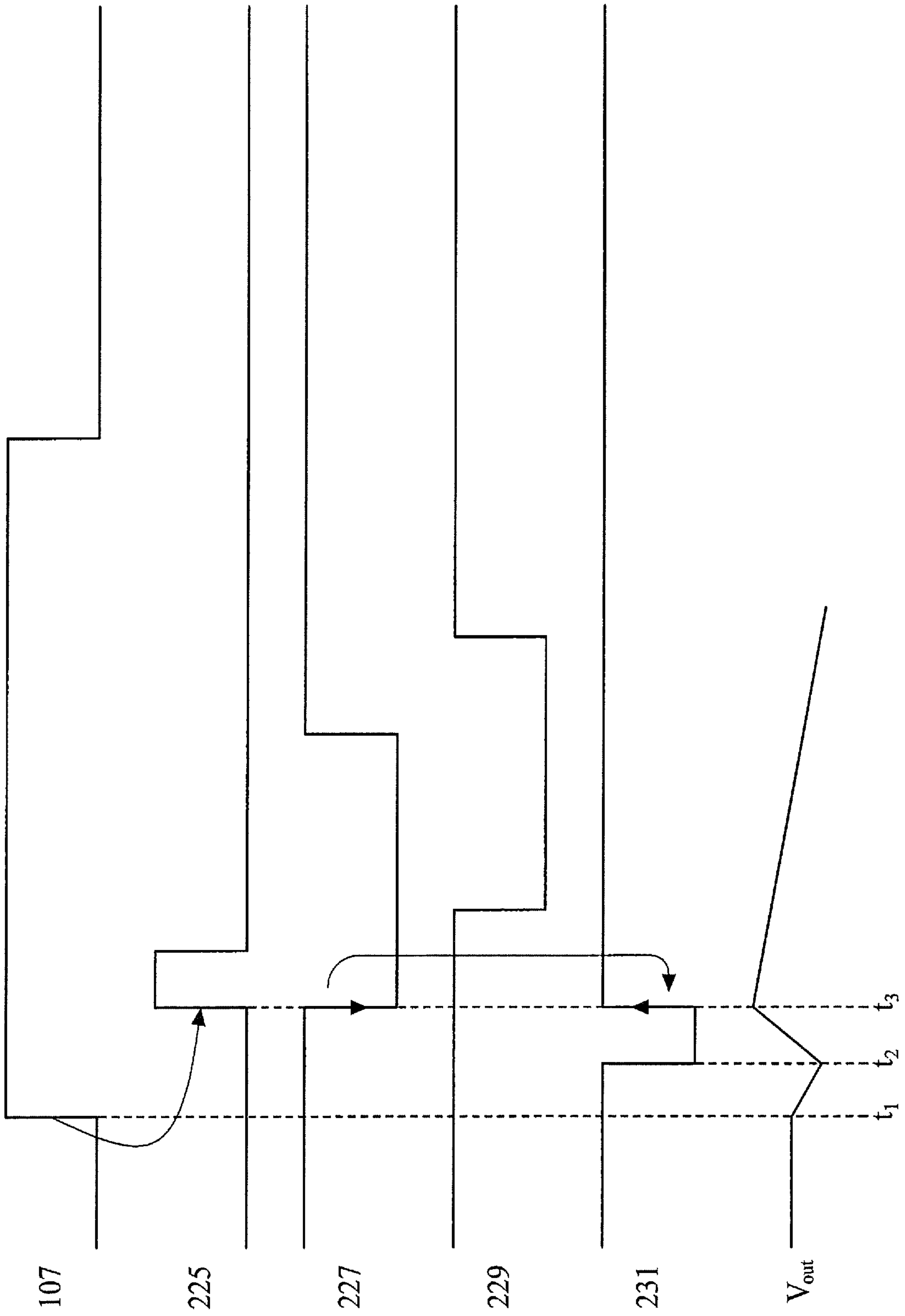
FIG. 3A illustrates a first set of waveforms of signals to operate the LDO regulator circuit of FIG. 1, in accordance with some embodiments.
Figure 3B:
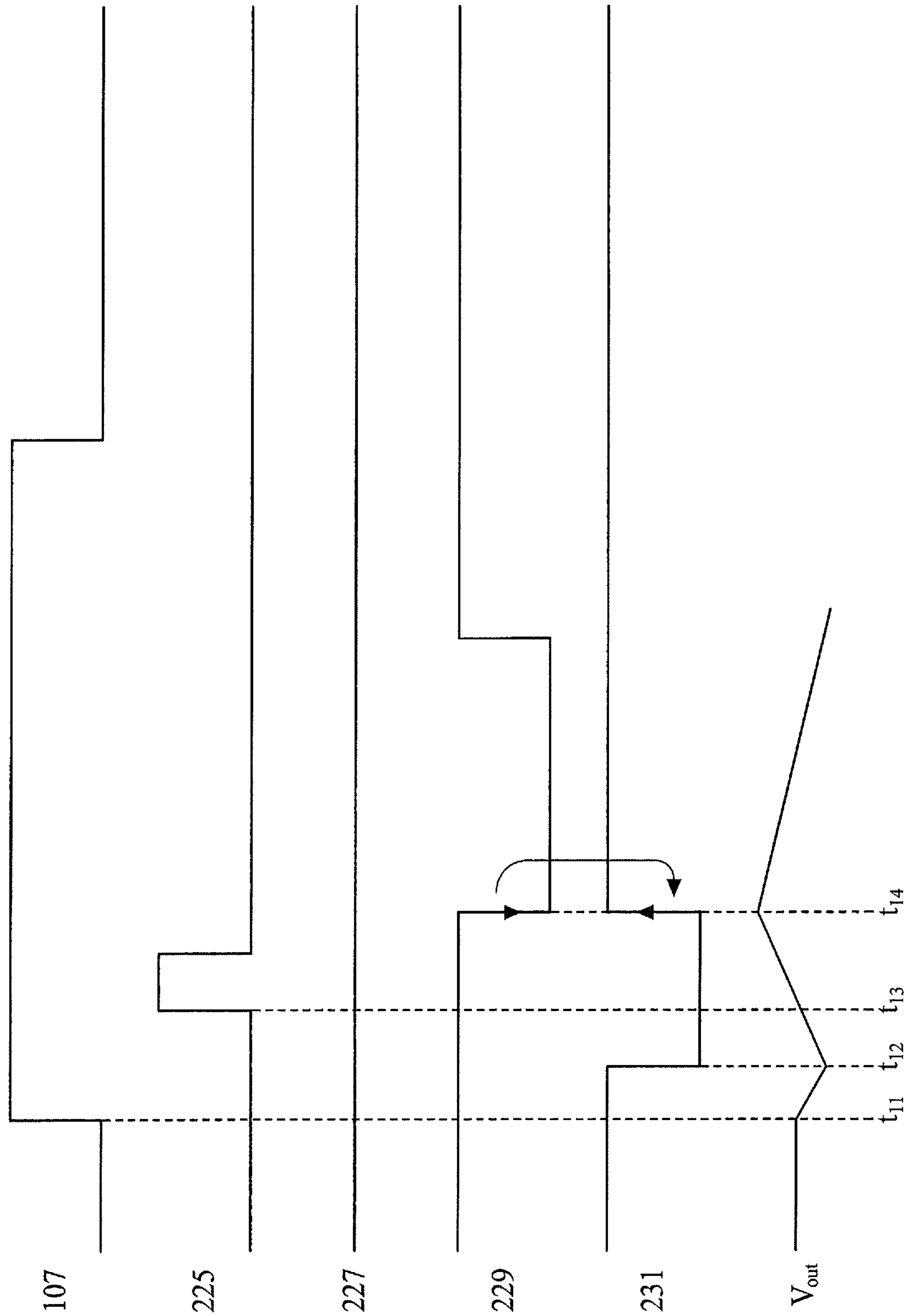
FIG. 3B illustrates a second set of waveforms of signals to operate the LDO regulator circuit of FIG. 1, in accordance with some embodiments.

FIGS. 3A and 3B illustrate first and second sets of exemplary waveforms of plural signals (e.g., the EN signal 107, the sensor enable signal 225, the sensor output signal 227, the inverted delayed signal 229, the injection control signal 231, and the output voltage $V_{out}$) to operate the disclosed LDO regulator circuit 100, respectively, in accordance with some embodiments. More specifically, the first set of waveforms (FIG. 3A) are formed when the voltage level of the output voltage $V_{out}$ is monitored to be higher than the voltage level of $V_{ref}$; and the second set of waveforms (FIG. 3B) are formed when the voltage level of the output voltage $V_{out}$ is monitored to be lower than the voltage level of $V_{ref}$. Since the plural signals (107, 225, 227, 229, 231, and $V_{out}$) are used by the LDO regulator circuit 100 to perform a respective operation, the following discussions of FIGS. 3A and 3B are provided in conjunction with FIGS. 1, and 2A-2C.

Referring first to FIG. 3A, as mentioned above, when the load of the LDO regulator circuit 100, 110, is used/accessed at time "t1," the EN signal 107 transitions from a logical low state (LOW) to a logical high state (HIGH). As such, since the sensor output signal 227 and the inverted delayed signal 229 remain at HIGH (due to respective delays provided by the delay circuit 224), the injection control signal 231 may transition from HIGH to LOW at time "t2." In some embodiments, t2 may be behind t1 by about a gate delay (i.e., the delay provided by the NAND gate 228). It is noted in FIG. 3A that at time t1, the voltage level of the output voltage $V_{out}$ has a transient drop. Such a transient drop may be due to a sudden increase of an output current through the load 110, in accordance with some embodiments. Once the injection control signal 231 transitions to LOW at time t2, the injection circuit 230 (the PMOS transistor 232) is turned on so as to provide the injection current $I_{inj}$ to the load 110. As such, the voltage level of $V_{out}$ may start to increase, as illustrated in FIG. 3A. At time "t3," the sensor enable signal 225 transitions from LOW to HIGH such that the sensor circuit 226 is activated. Once the sensor circuit 226 is activated, the sensor circuit 226 starts to compare the voltage levels of its two input signals: $V_{out}$ and $V_{ref}$. In some embodiments, when the voltage level of $V_{out}$ is higher than the voltage level of $V_{ref}$ (which is the scenario shown in FIG. 3A), the sensor circuit 226 outputs the sensor output signal 227 at LOW. Accordingly, after performing the NAND logic function on the HIGH EN signal 107, the LOW sensor output signal 227, and the either HIGH or LOW inverted delayed signal 229, the injection control signal 231 transitions from LOW to HIGH. As a result, the PMOS transistor 232 is turned off thereby causing the injection current $I_{inj}$ to be ceased flowing into the load 110. In some embodiments, since the injection current $I_{inj}$ is terminated timely (by monitoring the voltage level of the output voltage $V_{out}$), an overshoot of the output voltage $V_{out}$ is advantageously suppressed. Such a suppressed overshoot of the output voltage $V_{out}$ provides various advantages over the conventional LDO regulators, for example, to protect the LDO regulator circuit 100's coupled circuit (e.g., one or more loads of the LDO regulator circuit 100).

Referring next to FIG. 3B, similarly, when the load 110 is used/accessed at time "t11," the EN signal 107 transitions from LOW to HIGH. As such, since the sensor output signal 227 and the inverted delayed signal 229 remain at HIGH (due to respective delays provided by the delay circuit 224), the injection control signal 231 may transition from HIGH to LOW at time "t12." In some embodiments, t12 may be behind t11 by about a gate delay (i.e., the delay provided by the NAND gate 228). Once the injection control signal 231 transitions to LOW at time t12, the injection circuit 230 (the PMOS transistor 232) is turned on so as to provide the injection current $I_{inj}$ to the load 110. As such, the voltage level of $V_{out}$ may start to increase, as illustrated in FIG. 3B. Subsequently, at time "t13," the sensor enable signal 225 transitions from LOW to HIGH such that the sensor circuit 226 is activated. Similarly, after being activated, the sensor circuit 226 starts to compare the voltage levels of $V_{out}$ and $V_{ref}$. In some embodiments, when the voltage level of $V_{out}$ is lower than the voltage level of $V_{ref}$ (which is the scenario shown in FIG. 3B), the sensor circuit 226 remains the sensor output signal 227 at HIGH. As such, the injection control signal 231 remains at LOW. Subsequently, at time "t14," the inverted delayed signal 229 transitions from HIGH to LOW because the EN signal 107 transitions to HIGH and such a transition is delayed by the delay circuit 224 and further logically inverted by the inverter 222. Accordingly, after performing the NAND logic function on the HIGH EN signal 107, the HIGH sensor output signal 227, and the LOW inverted delayed signal 229, the injection control signal 231 transitions from LOW to HIGH. As a result, the PMOS transistor 232 is turned off thereby causing the injection current $I_{inj}$ to be ceased flowing into the load 110. In the scenario of FIG. 3B, even though when the voltage level of $V_{out}$ is not greater than the pre-defined voltage level $V_{ref}$, the injection current $I_{inj}$ can still be terminated by a pre-defined delay, e.g., the gate delays provided by the delay circuit 224. As such, the injection current $I_{inj}$ may not be endlessly provided to the load 110, which may advantageously lower power consumption of the LDO regulator circuit 100.

It is noted that respective pulse widths of the sensor enable signal 225 and the inverted delayed signal 229 are different from each other in FIGS. 3A and 3B. In some embodiments, whether the pulses widths of the sensor enable signal 225 and the inverted delayed signal 229 are different or not may be determined based on a respective output behavior of the sensor circuit 226. More particularly, if the sensor circuit 226 can latch a logic state of its respective output signal (e.g., the sensor output signal 227) after the sensor enable signal 225 transitions to LOW, the pulse width of the sensor enable signal 225 may be narrower than the pulse width of the inverter delayed signal 229, which is the case illustrated in FIGS. 3A-3B. If the sensor circuit 226 cannot latch the logic state of the sensor output signal 227 after the sensor enable signal 225 transitions to LOW, the pulse widths of the sensor enable signal 225 and the inverted delayed signal 229 may be equal to each other.

In some embodiments, the voltage level of $V_{ref}$ may be selected to be different from the voltage level of the input voltage $V_{in}$ (FIG. 1). When the voltage levels of $V_{ref}$ and $V_{in}$ are different from each other, the LDO regulator circuit 100 may be adapted to be used in various applications. That is, any of a variety of circuits may be coupled to the LDO regulator circuit 100 as its load. Alternatively or additionally, the voltage level of $V_{ref}$ may be selected to be the same as the voltage level of the input voltage $V_{in}$, in some embodiments. As such, the voltage level of the output voltage $V_{out}$ may be regulated to be substantially close to the voltage level of the input voltage $V_{in}$. Accordingly, the LDO regulator circuit 100 may be operated in more sensitive fashion.

Figure 4:
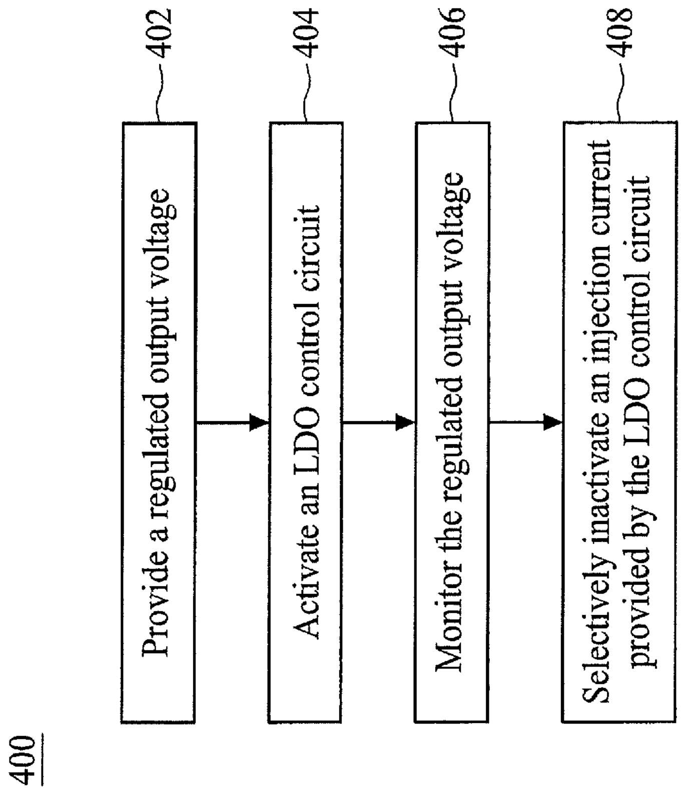
FIG. 4 illustrates a flow chart of a method to operate the LDO regulator circuit of FIG. 1, in accordance with various embodiments.

FIG. 4 illustrates a flow chart of a method 400 to stabilize the regulated output voltage $V_{out}$ of the LDO regulator circuit 100, in accordance with various embodiments. In various embodiments, the operations of the method 400 are performed by the respective components illustrated in FIGS. 1-3B. For purposes of discussion, the following embodiment of the method 400 will be described in conjunction with FIGS. 1-3B. The illustrated embodiment of the method 400 is merely an example. Therefore, it should be understood that any of a variety of operations may be omitted, re-sequenced, and/or added while remaining within the scope of the present disclosure.

The method starts with operation 402 in which a regulated output voltage is provided by an LDO regulator, in accordance with various embodiments. Using the LDO regulator circuit 100 as an example, the output voltage $V_{out}$ is provided by the LDO regulator 102 through regulating the unregulated input voltage $V_{in}$. In some embodiments, the voltage level of the output voltage $V_{out}$ may be slightly lower than the voltage level of the input voltage Vie.

The method continues to operation 404 in which a load is coupled to an output node of the LDO regulator or an already-coupled load is accessed such that an LDO control circuit, coupled to the LDO regulator, is activated, in accordance with various embodiments. Continuing with the above example, when the load of the LDO regulator 102 (also the load of the LDO regulator circuit 100), e.g., 110, is accessed, the enable (EN) signal 107 transitions to HIGH thereby activating the LDO control circuit 104. More specifically, when the EN signal transitions to HIGH, the injection circuit 230 of the LDO control circuit 104 is activated and configured to provide the injection current to flow into the load 110.

The method continues to operation 406 in which a voltage level of the regulated output voltage is dynamically monitored, in accordance with various embodiments. Depending on the loading level of the coupled load, the voltage level of the output voltage may vary. In some embodiments, a sensor circuit of the LDO control circuit dynamically monitors the voltage level of the output voltage and use a reference voltage level to compare such a voltage level of the output voltage. Continuing with the same example, the sensor circuit 226 of the LDO control circuit 104 dynamically compares the voltage levels of the output voltage $V_{out}$ and the reference voltage $V_{ref}$. The LDO control circuit 104 then determines whether the voltage level of $V_{out}$ is either higher or lower than the voltage level of $V_{ref}$.

The method continues to operation 408 in which the injection current provided by the LDO control circuit is selectively inactivated, in accordance with various embodiments. Continuing using the above example, when the sensor circuit 226 determines that the voltage level of $V_{out}$ is higher than the voltage level of $V_{ref}$, the sensor circuit 226 asserts the sensor output signal 227 to LOW so as to cause the injection circuit 230 to cease providing the injection current $I_{inj}$ (i.e., the injection current is inactivated), which is illustrated in the scenario of FIG. 3A. On the other hand, when the sensor circuit 226 determines that the voltage level of $V_{out}$ is lower than the voltage level of $V_{ref}$, the delay circuit 224 asserts the inverted delayed signal 229 to LOW through the inverter 222 so as to cause the injection circuit 230 to cease providing the injection current $I_{inj}$ (i.e., the injection current is inactivated), which is illustrated in the scenario of FIG. 3B.

In an embodiment, a voltage regulation circuit is disclosed. The circuit includes a voltage regulator that is configured to provide a stable output voltage based on an input voltage; and a control circuit, coupled to the voltage regulator, and configured to provide an injection current to maintain the stable output voltage in response to an enable signal provided at an input of the control circuit transitioning to a predetermined state and cease providing the injection current when the control circuit detects that a voltage level of the output voltage is higher than a pre-defined voltage level.

In another embodiment, a voltage regulation circuit includes a voltage regulator that is configured to provide a stable output voltage based on an input voltage; and a control circuit, coupled to the voltage regulator, and configured to provide an injection current to maintain the stable output voltage in response to an enable signal provided at an input of the control circuit transitioning to a predetermined state. The control circuit further comprises: a sensor circuit configured to compare a voltage level of the output voltage and a pre-defined voltage level so as to provide a sensor output signal; a delay circuit configured to provide a delay output signal; a NAND logic gate, coupled to the sensor circuit and the delay circuit, and configure to perform a NAND logic function on the enable signal, the sensor output signal, and the delay output signal, and based on a combination of respective logic states of the enable signal, the sensor output signal, and the delay output signal to provide an injection control signal; and a p-type metal-oxide-semiconductor (PMOS) transistor, gated by the injection control signal, and configured to selectively provide the injection current based on a logic state of the injection control signal.

Yet in another embodiment, a method for controlling a voltage regulator to provide an output voltage based on an input voltage includes providing an injection current to the voltage regulator in response to an enable signal; and selectively ceasing providing the injection current when detecting a voltage level of the output voltage is higher than a pre-defined voltage level.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage regulation circuit, comprising:
a voltage regulator; and
a control circuit, coupled to the voltage regulator, and configured to provide an injection current to maintain a stable output voltage in response to an enable signal provided at an input of the control circuit transitioning to a predetermined state and cease providing the injection current when the control circuit detects that a voltage level of the output voltage is higher than a pre-defined voltage level,
wherein the control circuit is configured to selectively cease providing the injection current when detecting a voltage level of the output voltage is higher than a pre-defined voltage level by turning off a transistor in response to receiving an injection control signal, wherein the control circuit further comprises:
a sensor circuit configured to compare the voltage level of the output voltage and the pre-defined voltage level so as to provide a sensor output signal; and
a delay circuit configured to provide a delay output signal, wherein the control circuit further comprises a logic gate, coupled to the sensor circuit and the delay circuit, and configured to perform a logic function on the enable signal, the sensor output signal, and a logically inverted signal of the delay output signal, and based on a combination of respective logic states of the enable signal, the sensor output signal, and the logically inverted signal of the delay output signal to provide the injection control signal.

2. The circuit of claim 1, wherein the enable signal transitions to a high logic state when an external load of the voltage regulator is accessed.

3. The circuit of claim 2, wherein the external load includes a memory device.

4. The circuit of claim 3, wherein the logic gate comprises a NAND logic gate.

5. The circuit of claim 4,
wherein when the sensor circuit determines that the voltage level of output voltage is higher than the pre-defined voltage level, the sensor circuit asserts the sensor output signal to a low logic state so as to cause the NAND logic gate to assert the injection control signal to the low logic state.

6. The circuit of claim 5, wherein when the injection control signal is asserted to the low logic state, a PMOS transistor is turned off such that the control circuit cease providing the injection current.

7. The circuit of claim 6, wherein the PMOS transistor operates under a linear mode.

8. The circuit of claim 4, wherein the logic gate comprises a NAND logic gate and when the sensor circuit determines that the voltage level of output voltage is lower than the pre-defined voltage level, the delay circuit asserts the delay output signal to the low logic state so as to cause the NAND logic gate to assert the injection control signal to the low logic state.

9. A voltage regulation circuit, comprising:

a voltage regulator that is configured to provide a stable output voltage based on an input voltage; and a control circuit, coupled to the voltage regulator, and configured to provide an injection current to maintain the stable output voltage in response to an enable signal provided at an input of the control circuit transitioning to a predetermined state, wherein the control circuit is configured to selectively cease providing the injection current when detecting a voltage level of the stable output voltage is higher than a pre-defined voltage level by turning off a p-type metal-oxide-semiconductor (PMOS) transistor in response to receiving an injection control signal, wherein the control circuit further comprises:

a sensor circuit configured to compare the voltage level of the output voltage and the pre-defined voltage level so as to provide a sensor output signal; and a delay circuit configured to provide a delay output signal, wherein the control circuit further comprises a logic gate, coupled to the sensor circuit and the delay circuit, and configured to perform a logic function on the enable signal, the sensor output signal, and a logically inverted signal of the delay output signal, and based on a combination of respective logic states of the enable signal, the sensor output signal, and the logically inverted signal of the delay output signal to provide the injection control signal.

10. The circuit of claim 9, wherein the enable signal transitions to a high logic state when an external load of the voltage regulator is accessed.

11. The circuit of claim 10, wherein the external load includes a memory device.

12. The circuit of claim 9, wherein the logic gate comprises a NAND logic gate.

13. The circuit of claim 12, wherein when the sensor circuit determines that the voltage level of output voltage is higher than the pre-defined voltage level, the sensor circuit asserts the sensor output signal to a low logic state so as to cause the NAND logic gate to assert the injection control signal to the low logic state.

14. The circuit of claim 9, wherein when the injection control signal is asserted to the low logic state, the PMOS transistor is turned off such that the control circuit cease providing the injection current.

15. The circuit of claim 9, wherein the PMOS transistor operates under a linear mode.

16. A voltage regulation circuit, comprising:

a voltage regulator that is configured to provide a stable output voltage based on an input voltage; and a control circuit, coupled to the voltage regulator, and configured to provide an injection current to maintain the stable output voltage in response to an enable signal provided at an input of the control circuit transitioning to a predetermined state, wherein the control circuit is configured to selectively cease providing the injection current when detecting a voltage level of the stable output voltage is higher than a pre-defined voltage level, wherein the control circuit further comprises:

a sensor circuit configured to compare the voltage level of the output voltage and the pre-defined voltage level so as to provide a sensor output signal; and a delay circuit configured to provide a delay output signal, wherein the control circuit further comprises a NAND logic gate, coupled to the sensor circuit and the delay circuit, and configured to perform a logic function on the enable signal, the sensor output signal, and a logically inverted signal of the delay output signal, and based on a combination of respective logic states of the enable signal, the sensor output signal, and the logically inverted signal of the delay output signal to provide the injection control signal.

17. The circuit of claim 16, wherein the enable signal transitions to a high logic state when an external load of the voltage regulator is accessed.

18. The circuit of claim 17, wherein the external load includes a memory device.

19. The circuit of claim 16, wherein when the sensor circuit determines that the voltage level of output voltage is higher than the pre-defined voltage level, the sensor circuit asserts the sensor output signal to a low logic state so as to cause the NAND logic gate to assert the injection control signal to the low logic state.

20. The circuit of claim 9, wherein the control circuit ceases to provide the injection current by turning off a p-type metal-oxide-semiconductor (PMOS) transistor in response to receiving the injection control signal, and wherein when the injection control signal is asserted to the low logic state, the PMOS transistor is turned off such that the control circuit cease providing the injection current.

* * * * *